United States Patent [19]
Duncan et al.

[11] 3,950,820
[45] Apr. 20, 1976

[54] POULTRY CUTTER

[75] Inventors: William D. Duncan; Carolyn L. Duncan; Richard O. Stants, all of Kokomo; James J. Sims; David C. Staley, both of Marion, all of Ind.

[73] Assignee: Duncan Creations, Inc., Marion, Ind.

[22] Filed: Jan. 24, 1974

[21] Appl. No.: 436,361

[52] U.S. Cl. .................................................. 17/11
[51] Int. Cl.² ......................................... A22C 21/00
[58] Field of Search .............................. 17/11, 52

[56] References Cited
UNITED STATES PATENTS

| | | | |
|---|---|---|---|
| 1,943,077 | 1/1934 | Jansen | 17/11 |
| 2,766,477 | 10/1956 | Dahlberg | 17/11 |
| 2,807,046 | 9/1957 | Hebenheimer | 17/11 |
| 3,172,148 | 3/1965 | Hill | 17/11 |
| 3,199,143 | 8/1965 | Ousley et al. | 17/11 |
| 3,522,623 | 8/1970 | Pyron | 17/11 |
| 3,639,945 | 2/1972 | Duncan et al. | 17/11 |

Primary Examiner—Hugh R. Chamblee
Assistant Examiner—James D. Hamilton

[57] ABSTRACT

An automatic machine for sectioning poultry comprising a series of knives for performing selected cuts, and includes a mechanism for inserting the poultry carcasses into the machine, as well as improved mechanisms for performing selected cuts and for centering a carcass to be split into two halves.

2 Claims, 13 Drawing Figures

POULTRY CUTTER

This invention is an improvement over the invention disclosed and claimed in our prior U.S. Pat. No. 3,639,945 granted Feb. 8, 1972 and entitled Poultry Cutter.

Said prior patent discloses apparatus for automatically sectioning poultry, or the like, into the nine pieces of so-called "fast-food" fried chicken restaurant and carry-out enterprises.

The present invention performs essentially the same operations and includes certain additional features and variations in the arrangement of elements.

As an example, in this improved form of the invention, automatic feeding means has been provided at the initial stage of operations which eliminates the necessity for the operator to push the carcass manually into engagement with the knives arranged to sever the wings from the body.

An additional feature of the present invention is the utilization of a two-step guide for the legs of the bird, and the initial positioning of the bird in the conveyor system in such a manner that, as the legs approach the severing knives, they snap downwardly to assist in this operation, eliminating the necessity for a separate conveyor to urge them through this operation.

A further feature is the employment of a variable mounting for the inlets of the two cooperating endless conveyors which engage the carcass to enable the conveyors to adjust to the dimensions of poultry of varying weight and also includes means for centering poultry carcasses of different sizes to ensure that when split in half, each side is substantially equal in weight.

A further feature of the improved apparatus is the provision of separate cutter mechanisms for severing each wing from its respective half of the body after the carcass has been split in two.

Still another object of the invention includes the use of power actuated guidance and advancing means for engaging each of the split carcass halves with a cutter means for positively severing each of the respective thighs from the body.

Other objects and advantages will be evident to those skilled in the art after reading the following specification and claims in connection with the annexed drawings.

Figure 1:
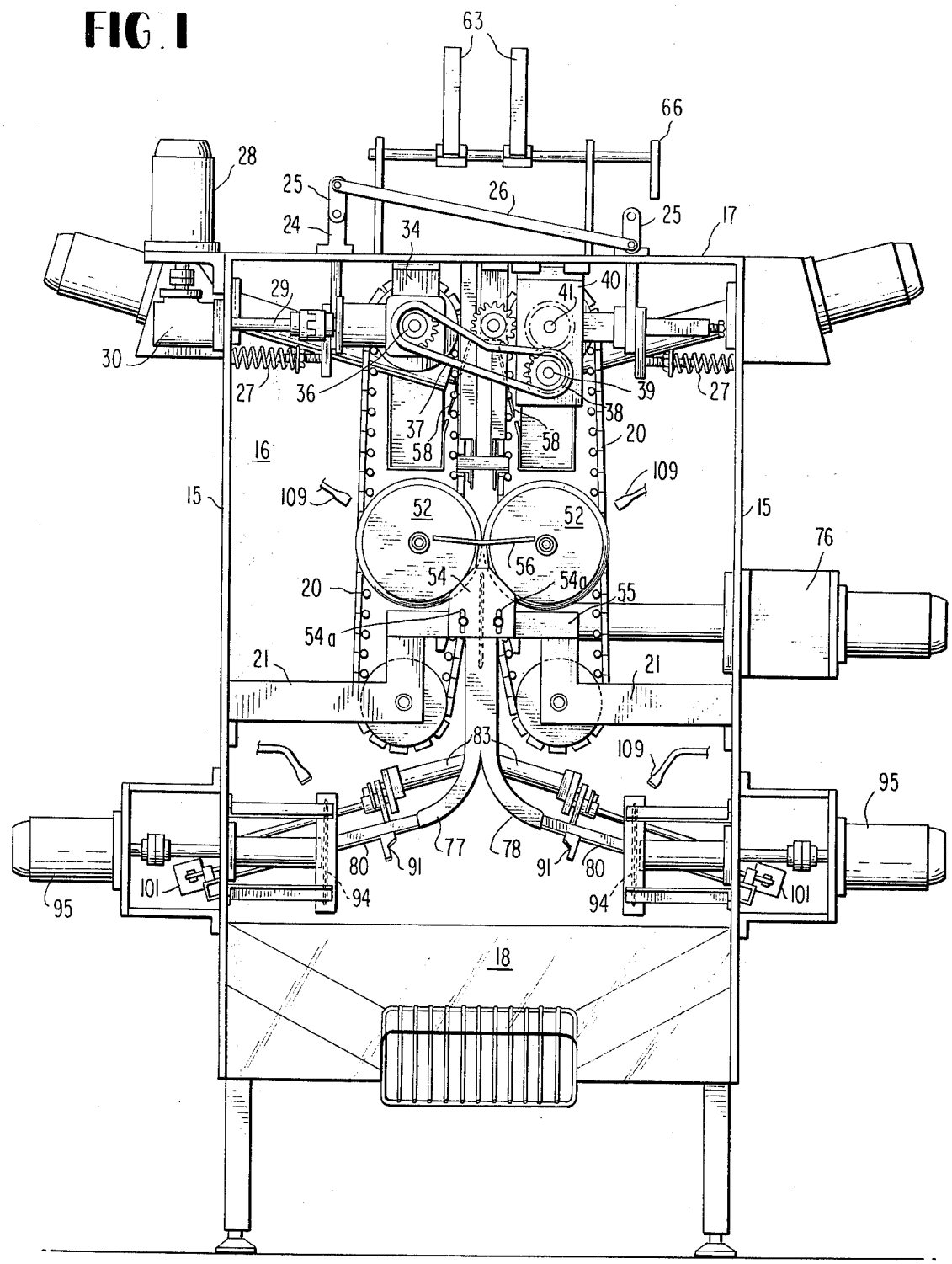
FIG. 1 is a front elevation of a preferred form of machine for automatically feeding poultry to a series of rotating knives for severing the carcass into a number of separate pieces according to the invention.
Figure 2:
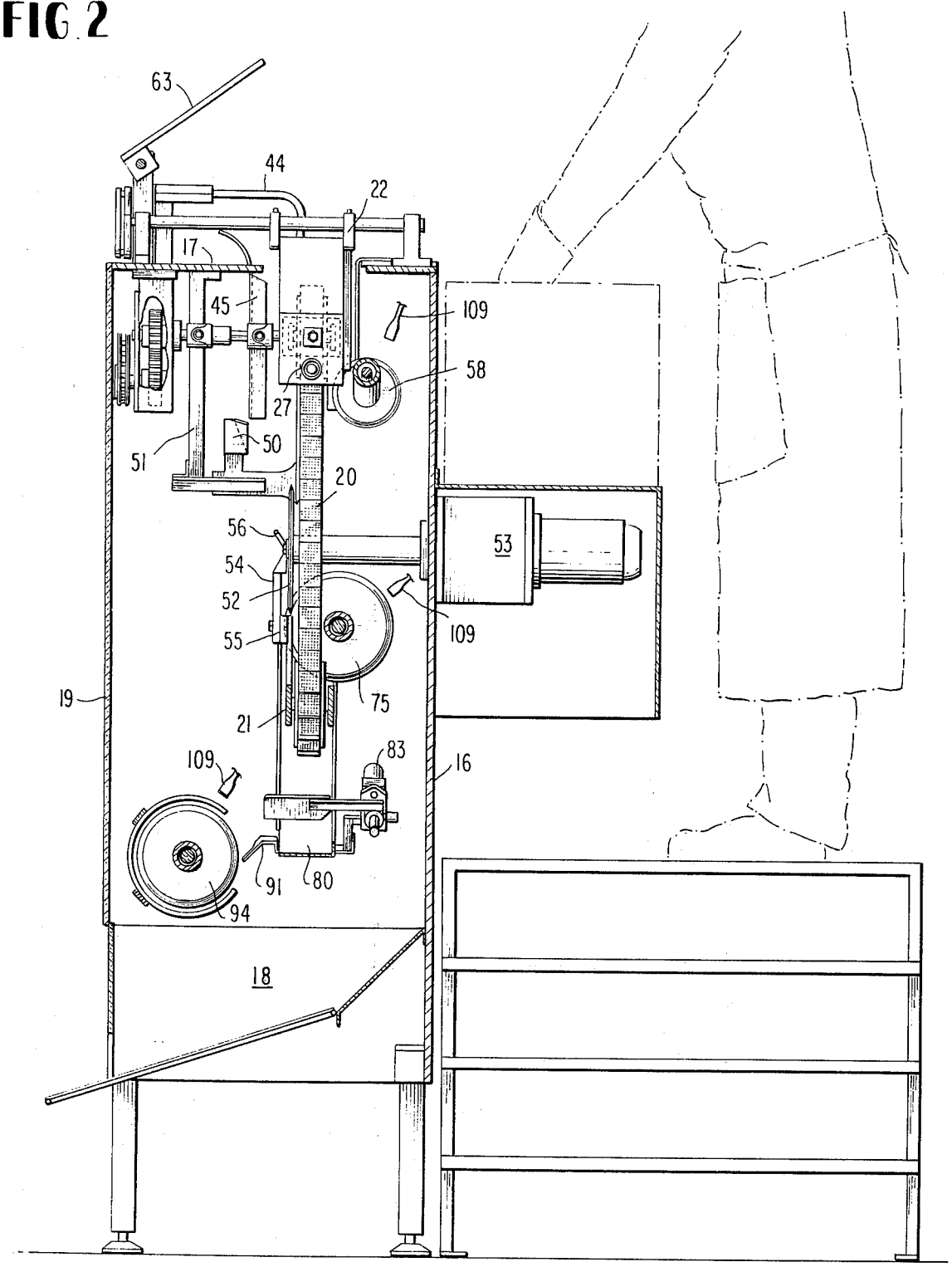
FIG. 2 is a view in elevation taken from the right side of FIG. 1.
Figure 3:
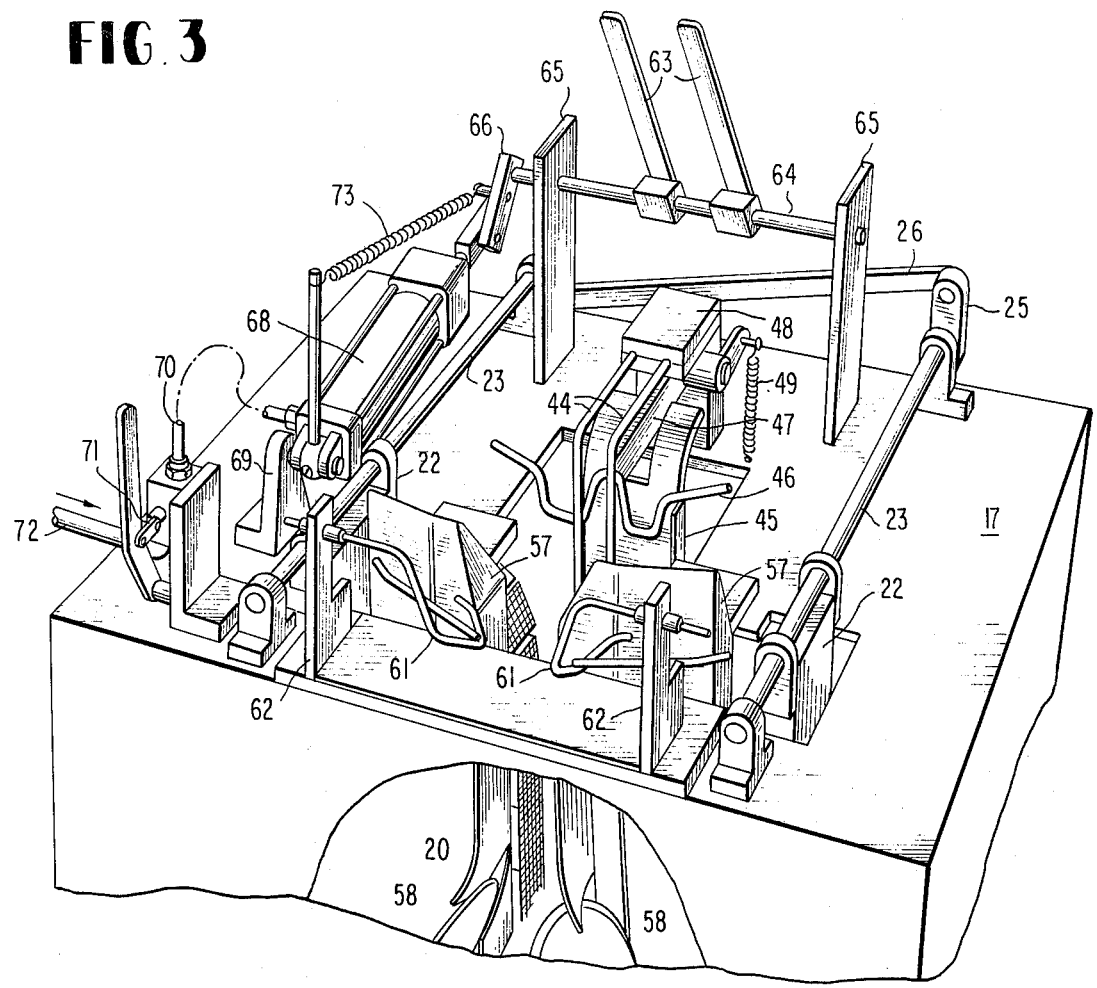
FIG. 3 is a perspective view looking down on the top of the machine towards the feeding station taken from a point toward the right, and behind the plane of, FIG. 2.
Figure 4:
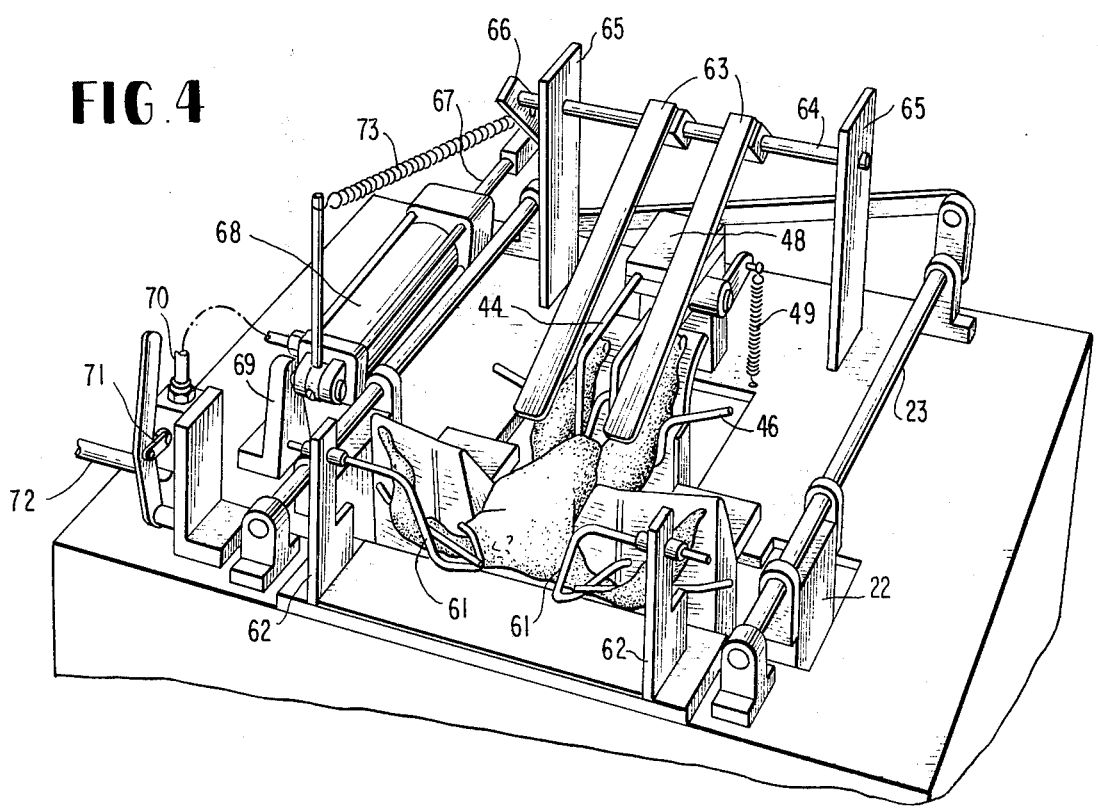
FIG. 4 is similar to FIG. 3, but showing the insertion of a carcass into the machine.

As can be seen from FIGS. 1 and 2, the operating components of the poultry sectioning machine are contained within a generally rectangular enclosure having side panels 15, rear panel 16, top wall 17, a collection chamber 18 at the bottom into which the severed pieces drop by gravity, and which may serve as the inlet for a distributing conveyor system (not shown), and a removable front panel 19. Looking at FIGS. 3 and 4, it can be seen that a portion at the central rear of the top panel is cut away to permit the introduction of the dressed carcasses.

Figure 6:
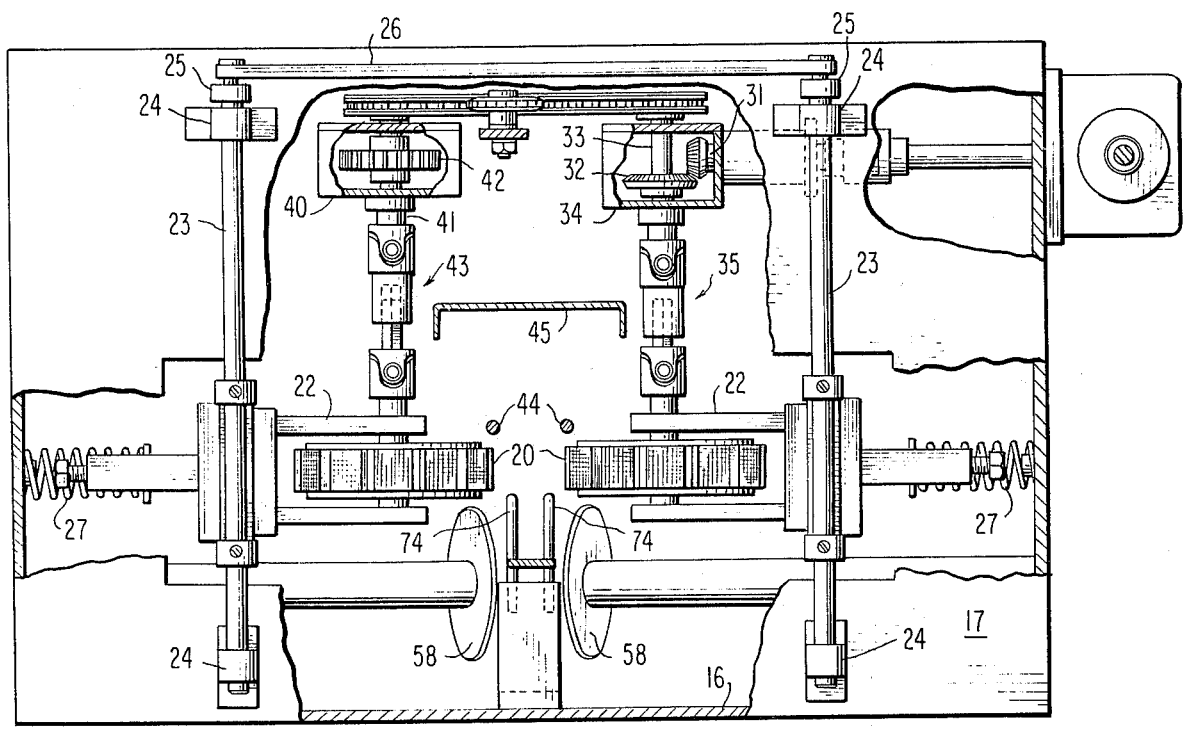
FIG. 6 is similar to FIG. 5, but with some of the elements removed to show how poultry of different sizes are accomodated.
Figure 5:
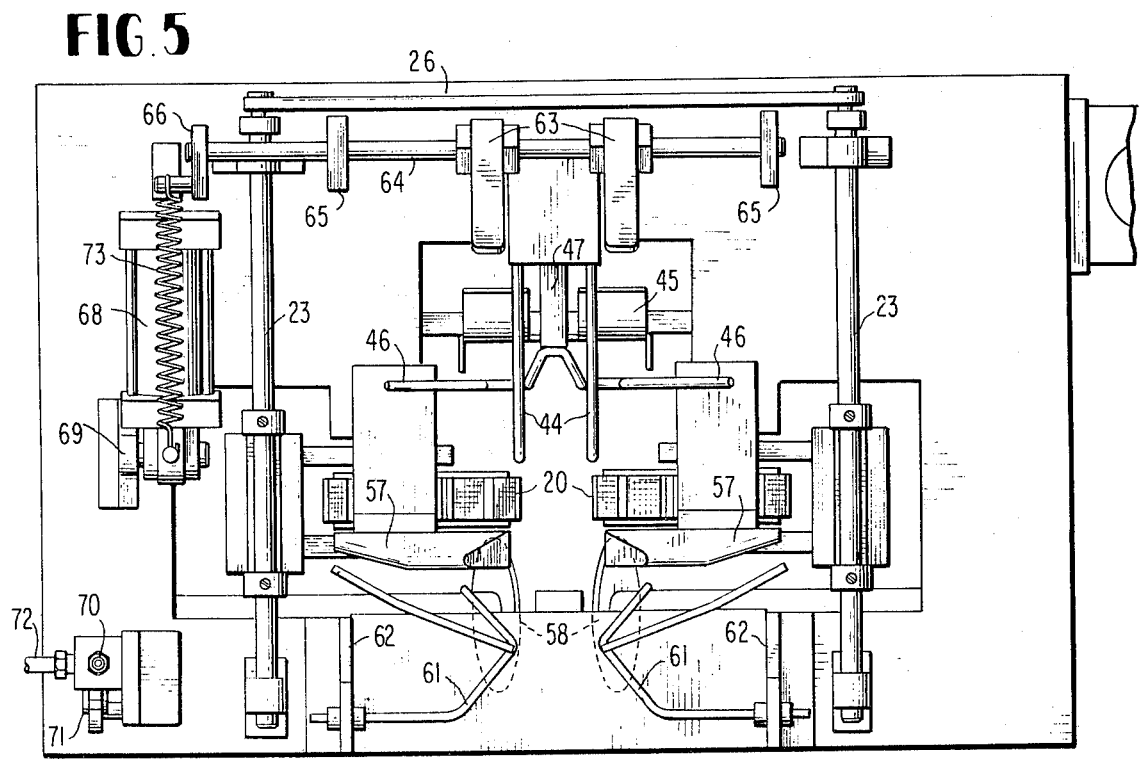
FIG. 5 is a plan view.

Just below the opening there are a pair of oppositely disposed, coacting, endless conveyors 20 consisting of a series of pivotally connected, toothed metal pads for gripping the opposite sides of the thigh and rib cage. The lower ends of the conveyors are carried by edler wheels which are rotatably supported by L-shaped arms 21 attached to side walls 15. The upper, driving wheels of the conveyors are rotatably mounted in a pair of downwardly depending L-shaped hangers 22 (FIGS. 2, 3 and 6), the upper ends of which are adjustably secured to shafts 23, the respective ends of which are mounted in bearing blocks 24 on the top wall 17. One of the shafts includes an upwardly directed arm 25, while the other shaft includes a similar arm 25 which is downwardly directed, and the outer extremities of these arms are each pivotally connected to the respective ends of a cross link 26, which ensures that a pivotal movement of one of the shafts in one direction can only occur with the concurrent pivotal movement of the other shaft in the opposite direction and in equal amount. This also means that the upper ends of the two conveyors can move toward and away from each as a result of equal and opposite displacement away from a central vertical transverse plane spared equally between them. The hangers 22 also are provided with adjustable compression spring means 27, which bear against the side walls to urge the conveyors toward each other.

Power for the conveyors is supplied by a motor 28, which drives a shaft 29 through reduction gearing 30. Shaft 29 is coupled to shaft 31 (FIG. 6) having a bevel gear connection 32 with shaft 33 mounted in a fixed bracket 34 secured to the top wall 17. The rear end of shaft 33 is connected to one of the driving wheels of a conveyor by means of an articulated and telescoping coupling 35, while the front end incudes a sprocket 38 on one end of a stub shaft 39 mounted on bracket 40. The bracket also supports shaft 41 and is connected by a pair of meshed gears 42 with shaft 39, and the forward end of shaft 41 is connected by an articulated and telescoping coupling 43, which drives the upper driving wheel of the other conveyor. With this arrangement, the opposing tracks of the two endless conveyors move downwardly together at the same speed, while the distance between them at the upper feeding end will be varied to accept birds of varying sizes while keeping the carcasses centered with respect to the other components of the machine.

At the feeding station at the top of the machine, there are several guides which cooperate with the conveyors for positioning the carcass and its extremities as it enters the machine. First, there are two L-shaped parallel rods 44 mounted on a bracket at the front to project downwardly into the entrance opening and spaced in front of the conveyor track. Second, there is a rearwardly facing, channel shaped guide 45 spaced forwardly of the guide rods to guide the ends of the legs for a certain distance along the conveyors. Third, is a W-shaped rod 46, which is supported in front of channel 45 on an arm 47, pivotally mounted on the bracket 48, and urged in an upward direction by a spring 49. The purpose of the W-rod is to ensure that when the carcass is inserted (see FIG. 4 and 13), it is centered and the legs will extend into channel guide 45 in an angularly upward direction away from the body until after the breast has been cut off.

Just below the lower end of channel guide 45, there is a short section 50, which is displaced further away from the conveyors, which causes the legs to drop abruptly downward a short distance when meeting the knives which sever them from the thighs. This short channel is supported by an L-shaped bracket 51 connected at one end to the top wall 17 so that the lower end can also support the lower ends of rods 44. Severing of the two legs at this point and slicing off of the breast is accomplished by two tangentially arranged knives 52, which are rotated at high speed by geared motors 53 mounted on the back wall 16. A triangular plate 54, mounted on a bridge 55, connecting the arms 21, deflects the severed meat away from the knives, and a transverse rod 56, above the plate prevents possible jamming of these knives by material which might stick to the blades.

Figure 7:
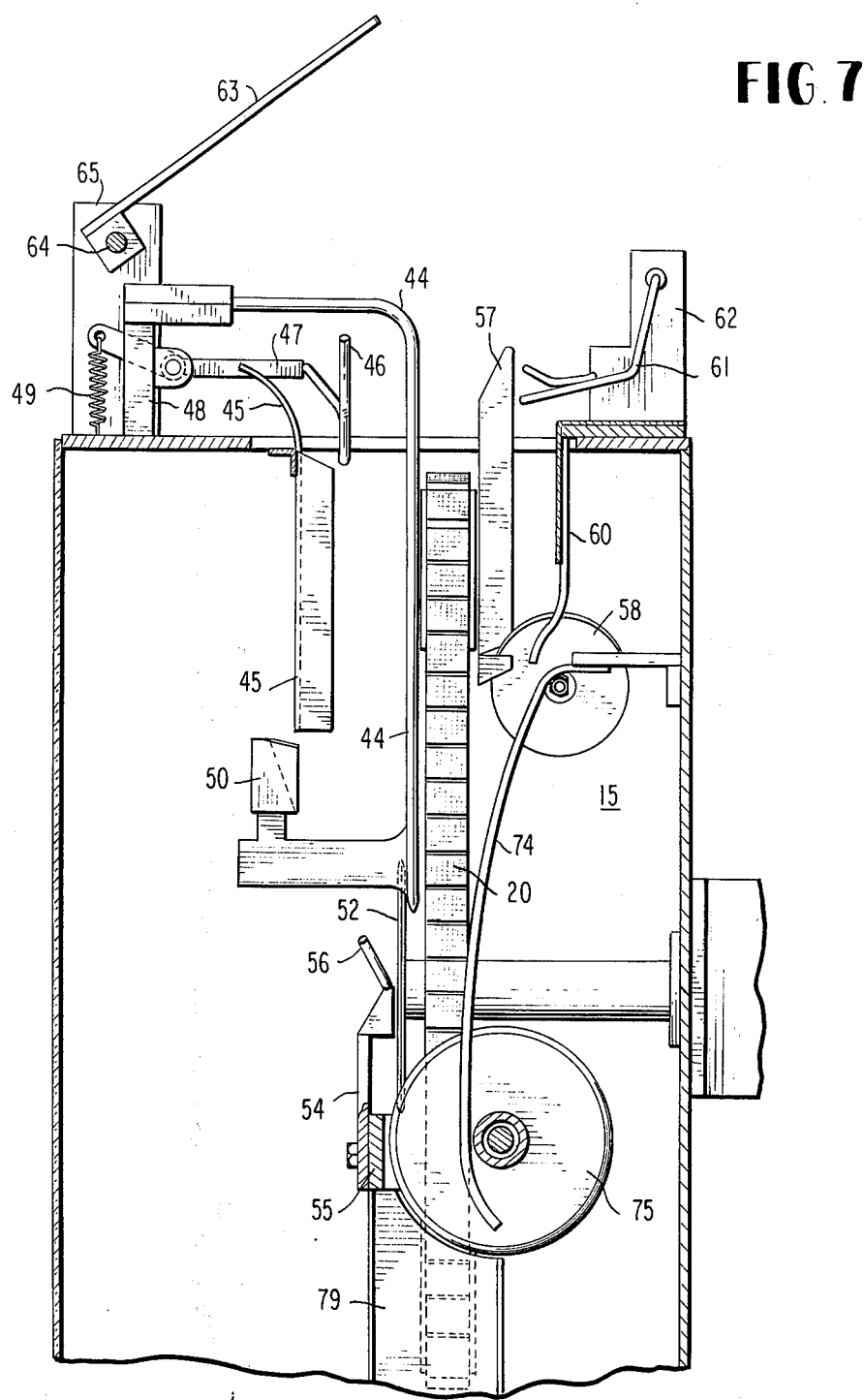
FIG. 7 is a partial vertical cross-section looking towards the left of FIG. 2.
Figure 8:
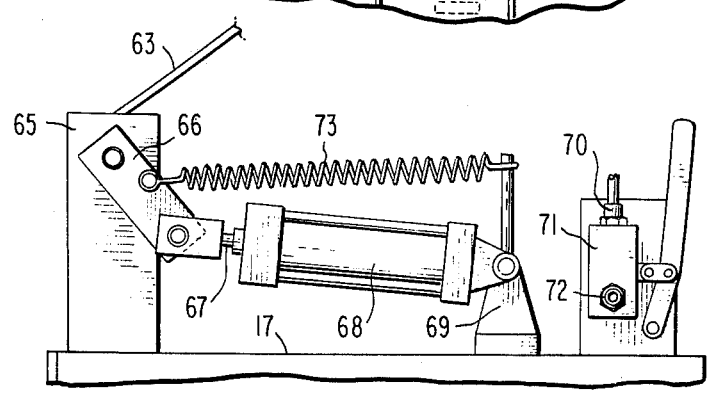
FIG. 8 is a fragmentary view of the feeder mechanism of FIG. 7.
Figure 13:
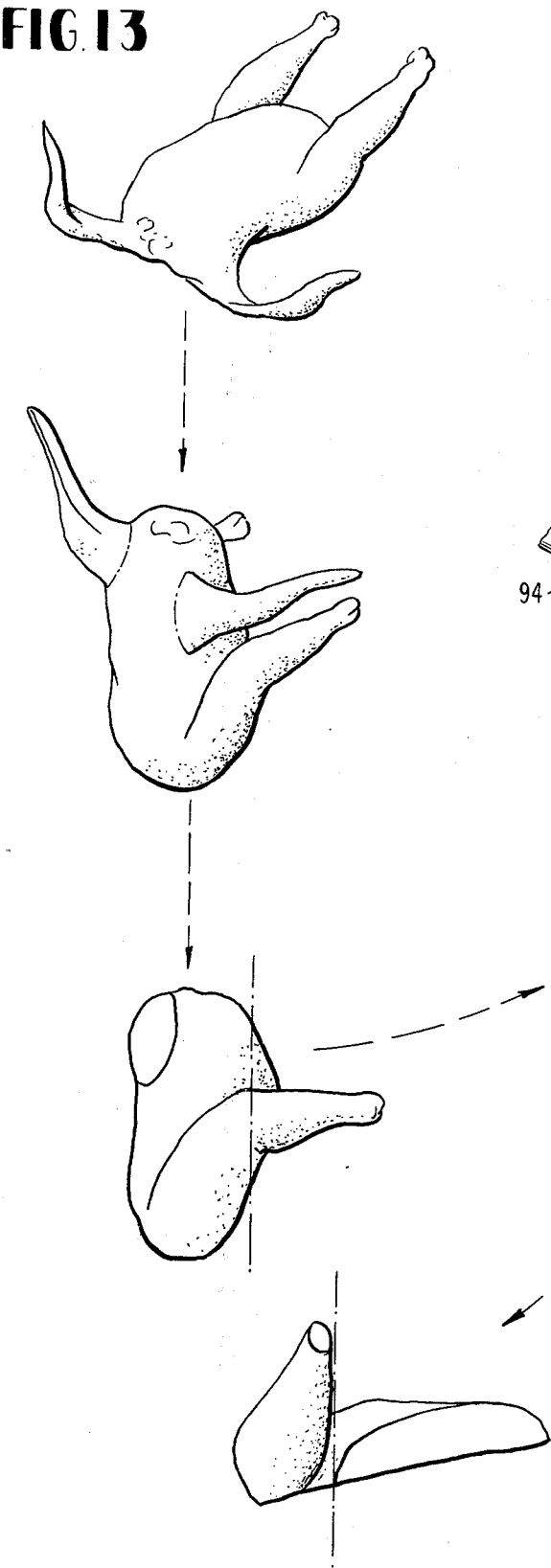
FIG. 13 is a schematic view showing the sequence of operations performed as a carcass moves throught the machine.

Turning back to the feeding station (FIGS. 3, 4 and 7), it can be seen that a transversely spaced pair of vertical plates 57 extend downwardly for a short distance below the top wall 17 to assist in positioning the wings of a bird until they reach the two rotary knives 58, driven by geared motors 59 attached to the side walls 15, where the wings are severed from the body. For proper performance, the knives are arranged in planes which are angularly related to each other and tilted inwardly with respect to the vertical, and another plate 60 is placed behind the plates 57 to assist in positioning the wings. In addition, a pair of downwardly directed, irregularly shaped guide rods 61 are mounted on brackets 62 above the feed station. When the bird is introduced into the feed station the respective wings must be placed under these rods and when this is done it ensures that the bird will be introduced into the machine feet uppermost, as shown in FIG. 13. In this position, the carcass is suspended by the legs above the conveyors 20.

To introduce the bird into engagement with the conveyors, a feeding mechanism is mounted on the top wall which includes a pair of parallel arms 63 attached to shaft 64 supported in horizontal position in brackets 65. A short actuating lever 66 is attached at one end of the shaft and connected to a power source, such as the piston rod 67 of an air operated cylinder 68 which is pivotally supported on bracket 69. Compressed air is introduced into the cylinder through tube 70 under the control of a valve 71 which is connected by conduit 72 to a source of compressed air (not shown). In the present machine, where the insertion of the poultry is by hand, the valve is manually controlled to cause the arms 63 to rotate downwardly against the legs of the bird (FIGS. 3 and 4) forcing the carcass down a sufficient amount to enable knives 58 to sever the wings from the body. When the valve is released, air escapes from the cylinder and a spring 73 returns the arms to their upper positions.

After the wings have been severed from the body by the knives 58, they drop into the collection chamber 18 and, as the body moves down to the position where the legs leave the channel guides 45 and 50, the body assumes a more or less vertical position (see FIG. 13) where the legs and breast are severed by knives 52 and also drop into the collection chamber. During this portion of downward travel, the carcass is urged toward the guide rods 44 by a second pair of slightly curved, resiliently mounted guide rods 74 (FIGS. 6 and 7), and also keeps the carcass properly positioned with respect to the knives 52 and plate 54, and also holds the carcass in position immediately thereafter while the carcass is being split into two similar pieces by the knife 75, driven by geared motor 76 mounted on one of the side walls 15, and at this point the respective halves drop into a pair of outwardly facing chutes 77 and 78 which, at their upper ends are placed back-to-back and divided by the common vertical wall 79.

The final severing of the thighs from each half of the rib cage takes place at the lower ends of the respective chutes 77 and 78 where they each turn outwardly in a nearly horizontal direction, as seen in FIG. 1. Since the severing mechanism for both chutes are similar, but mirror images of each other it will only be necessary to describe the mechanism connected with chute 78, as shown in detail in FIGS. 9 – 11.

Figure 9:
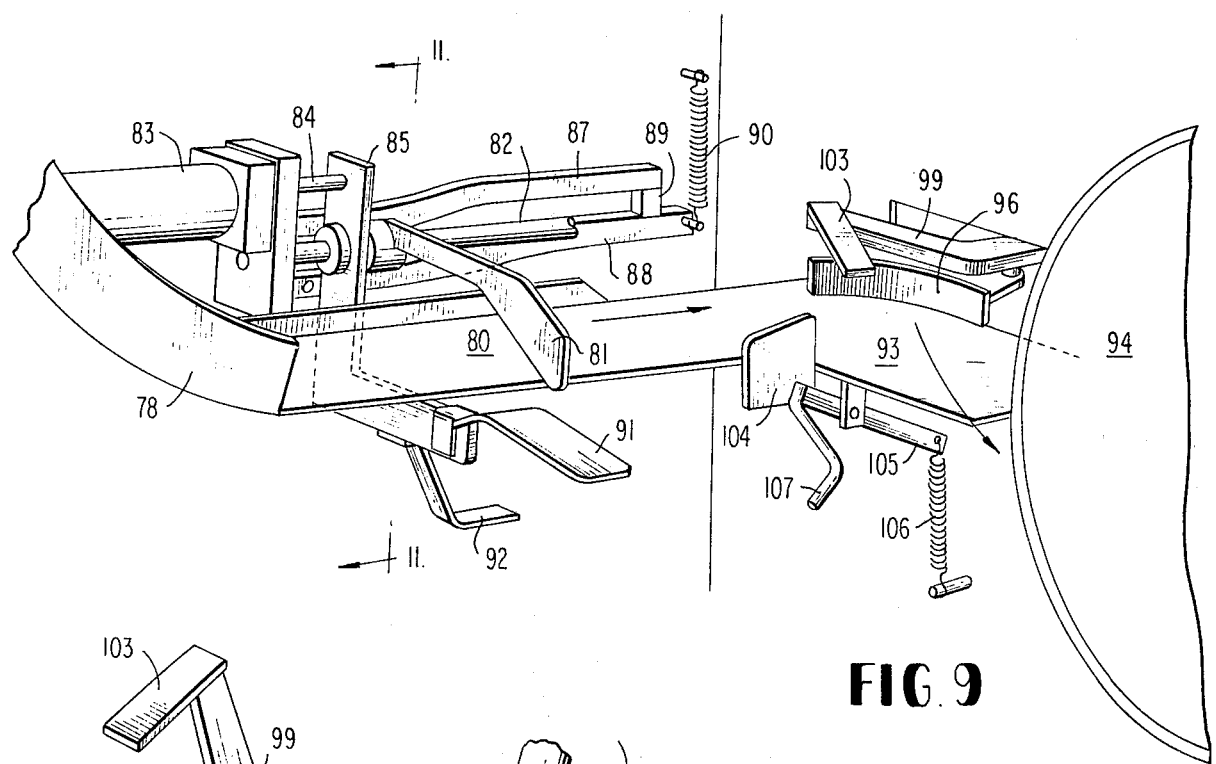
FIG. 9 is a fragmentary perspective view of the rib-thigh cutting section at the lower right of FIG. 1.
Figure 12:
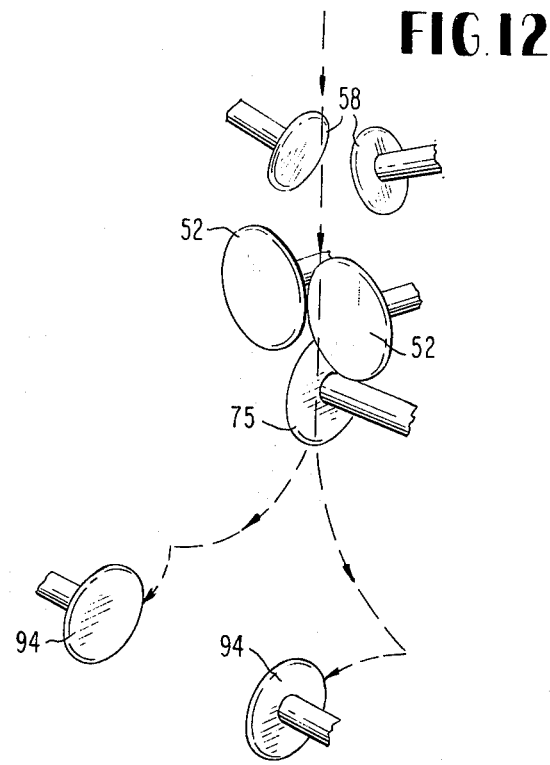
FIG. 12 is a schematic view showing the relationships of the various cutters.

As will be evident from FIGS. 12 and 13, each half of the rib cage, with its attached thigh portion, will slide with its flat severed surface in contact with the nearly horizontal extension surfaces of the respective shutes, the extension of chute 78 being designated by numeral 80 in FIG. 9, and with the projecting leg portion being in the leading position as it reaches the extension and slides under a pusher number 81 which extends across the extension surface. The inner end of the pusher is pivotally and slidably attached to a rod 82 which projects outwardly from the end of a cylinder 83 whose piston rod 84 is attached to the upper end of an L-shaped arm 85 which is slidable on the rod 82 is response to actuation of the piston rod. The pusher 81 is also connected to move along the rod with the L-shaped arm and also is provided with a rearward extension 86 which is desposed between two cam tracks 87 and 88. Upper track 87 is fixed and disposed to hold the pusher in an elevated position at the beginning of travel, as shown in FIG. 9, but includes an upwardly angled intermediate section which permits the pusher to drop down towards surface 80 for the remainder of its travel toward the right. The lower track 88 is pivoted at one end and urged upwardly against spacer 89 by spring 90. Thus, if the pusher is engaged with a particularly thick portion of meat on the surface 80, it is permitted to rise by temporary downward movement of track 88.

The L-shaped arm 85, by virtue of being mounted on rod 82 and also attached to piston rod 84, cannot rotate about rod 82. The lower extension of the arm is provided with a plate 91 which is generally aligned with and downwardly inclined from surface 80. Depending from below the arm there is also a tripping element 92 which extends forwardly in the direction of movement of piston rod 84. The purpose of these two elements will be described shortly hereafter.

At a distance beyond the normal retracted position of pusher 81 (FIG. 9) which will permit even the largest size of severed meat portion to pass downwardly beyond the pusher, the extension surface 80 merges into a further extension surface 93 which extends in a right-angled direction, ending before the rotary knife 94, driven by motor 95, attached to side wall 15. At the junction between the two surfaces 80 and 93 there is a vertical stop element 96 which is curved to conform to the change in direction of the two surfaces. Element 96 is provided with a rearward extension 97 which is connected to a pivot pin 98 which depends from a medial location on a horizontally disposed V-shaped arm 99. This arm is provided with a bearing 100 spaced from one end thereof, which is carried on a vertical pivot (not shown) spaced from one side of surface 93 so that arm 99 can swing from a normal position along the side of the extension surface to a second position transversely overlying the surface and adjacent to the knife 94. This movement is controlled by an air operated piston-and-cylinder arrangement 101 connected to the arm beyond the bearing 100, as indicated at 102. At the other end of the arm there is attached a transversley projecting leg 103 which overlies the top of a portion of meat on the surface extension 93 to prevent its upward displacement.

A guide plate 104 is attached to one end of a lever 105, pivotally attached below surface 93 to place the plate normally in vertical position at the inside corner of surface 80 at its junction with surface 93 and lever 105 is urged toward this normal position by spring 106. Lever 105 also includes a depending rod 107 arranged so that when the trip element 92 engages it, the plate 104 will be lowered below the surfaces 80 and 93. In addition, a microswitch 108 is mounted on side wall 15 adjacent the stop element 96 when positioned as shown in FIG. 9. This microswitch controls the valve (not shown) which admits air under pressure to cylinder 83 for actuating piston rod 84.

Figure 10:
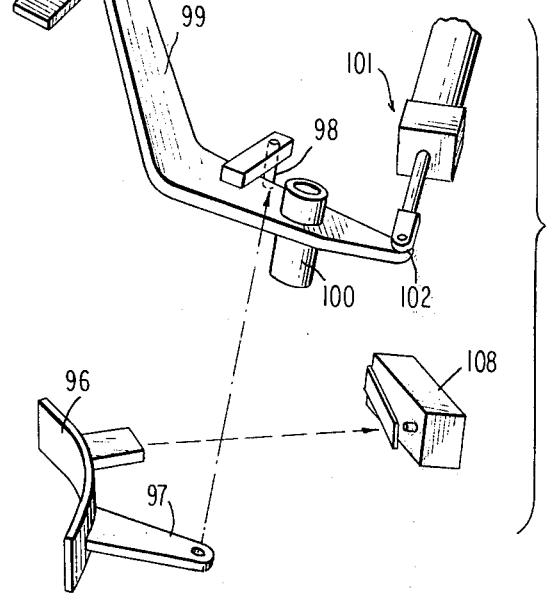
FIG. 10 is an exploded view of the control arms of FIG. 9.
Figure 11:
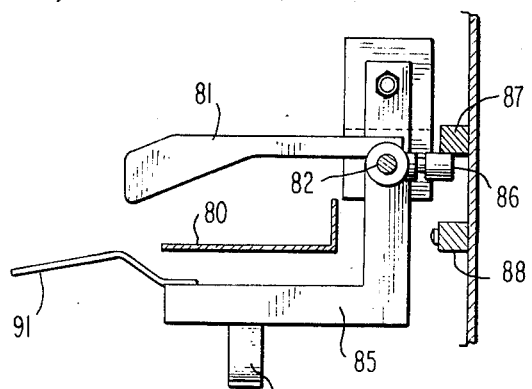
FIG. 11 is a cross-section taken on line 11—11 of FIG. 9.

The sequence of operation of the mechanisms of FIGS. 9 – 11 is as follows. When the half section of the carcass has been split by knife 75, the half section including the thigh slides by gravity down the surface 80 and below the pusher 81 to the inlet of the extension surface 93. The thigh portion is uppermost and faces toward the knife 94. When the half section hits the stop element 96 the microswitch 108 is activated to admit compressed air to cylinder 83 to move the pusher 81 towards the half section. As the pusher approaches, the cam track 87 allows it to drop by an amount sufficient for it to engage the upstanding thigh portion and push it to the far side of the plane of knife 94. At the same time, plate 104 prevents any turning of the body portion of the half section until the pusher has full advantage, at which point the trip 92 lowers the plate 104. Also, at this point another mechanism (not shown) causes compressed air to be introduced into piston and cylinder 101 causing rotation of arm 99. This rotation carries the curved stop element 96 towards the knife 94 which forces the half section with it along the surface 93. That portion of the body which was restrained by plate 104 moves along on plate 91 which lies on the near side of the knife. During this movement, the extension leg 103 prevents any upsetting of the carcass and maintains the previously severed surfaces of the body in contact with the supporting surfaces 80 and 93. Upon completion of the movement of stop elements 96 towards knife 94, the severed rib and thigh portions drop down into the collection chamber 18, and the piston and cylinder 101 returns the element 96 to its original position, while cylinder 83 returns pusher 81 to its starting position, elevated above surface 80, for allowing the next set of rib and thigh portions to slide down into engagement with element 96.

Two other features of the invention should also be mentioned. One is the fact that experience has shown that efficient operation of the mechanism make it desirable to supply each of the rotating cutting blades with a supply of cold water, especially at the areas where contact with the poultry takes place, as by means of nozzles 109. Water issuing from these nozzles also assists in maintaining other elements, such as the guides, conveyors and transporting surfaces free of waste particles of meat, skin and bones as well as residual grease and fat.

Another feature is embodies in the fact that plate 54 is attached to the bridge 55 by means of a pair of bolts which pass through parallel vertical slots 54a in the plate to allow for vertical adjustment of the plate. By changing the vertical positon of the plate, it is possible to regulate the proportionate amount of breast meant removed from each carcass by the blades 52. Raising the position of the plate 54 reduces the amount of meat removed, while lowering it increases the amount. Furthermore, this appears to hold true regardless of the overall size and weight of the bird being processed.

We claim:

1. In a poultry cutting machine for severing the thigh portion from the rib cage of a centrally split carcass, comprising a surface for supporting said half section with the previously severed area in contact therewith, cutting means disposed in a plane transverse to the plane of said surface reciprocating pusher means for advancing said half section towards said cutting means and means for positively positioning the thigh and rib portions of opposite sides of said cutting means during said advancing to ensure severing of the respective portions comprising stop means for limiting said advancing of the half section, and second reciprocating means for moving said stop means in a direction to engage the half section with said cutting means.

2. The invention defined in claim 1, wherein said means for positively positioning said thigh and rib portions on opposite sides of the cutting means includes guide means movable between a first position to prevent movement of the thigh portion toward the cutting means and a second position to allow said movement after the thigh portion is positioned on the opposite side of the cutting means.

* * * * *